United States Patent [19]

Kim et al.

[11] 3,728,590

[45] Apr. 17, 1973

[54] CHARGE COUPLED DEVICES WITH CONTINUOUS RESISTOR ELECTRODE

[75] Inventors: Choong-Ki Kim, San Jose; Edward H. Snow, Los Altos, both of Calif.

[73] Assignee: Fairchild Camera and Instrument Corporation, Mountain View, Calif.

[22] Filed: Apr. 21, 1971

[21] Appl. No.: 136,087

[52] U.S. Cl..........317/235 R, 317/235 B, 317/235 G, 317/235 AT, 307/304

[51] Int. Cl...............................................H01l 11/14

[58] Field of Search................................317/235 AT

[56] References Cited

UNITED STATES PATENTS

| | | | |
|---|---|---|---|
| 3,473,032 | 10/1969 | Lehovec | 317/235 |
| 3,611,070 | 10/1971 | Engeler | 317/235 |

FOREIGN PATENTS OR APPLICATIONS

| | | | |
|---|---|---|---|
| 30,059 | 11/1969 | Japan | 317/235 |

OTHER PUBLICATIONS

Applied Physics Letters, "Charge Coupled 8–Bit Shift Register" by Tompsett et al. Aug 1, 1970 pages 111–115

*Primary Examiner*—Jerry D. Craig
*Attorney*—Roger S. Borovoy, Alan H. MacPherson and Charles L. Botsford

[57] ABSTRACT

A charge coupled device comprises a semiconductor substrate containing on one surface an insulating layer together with a plurality of electrodes spaced from each other by resistive material. This resistive material prevents the formation of potential barriers between the electrodes and increases the speed of transfer of charge from beneath one electrode to beneath an adjacent electrode.

7 Claims, 3 Drawing Figures

PATENTED APR 17 1973 3,728,590
FIG. 1
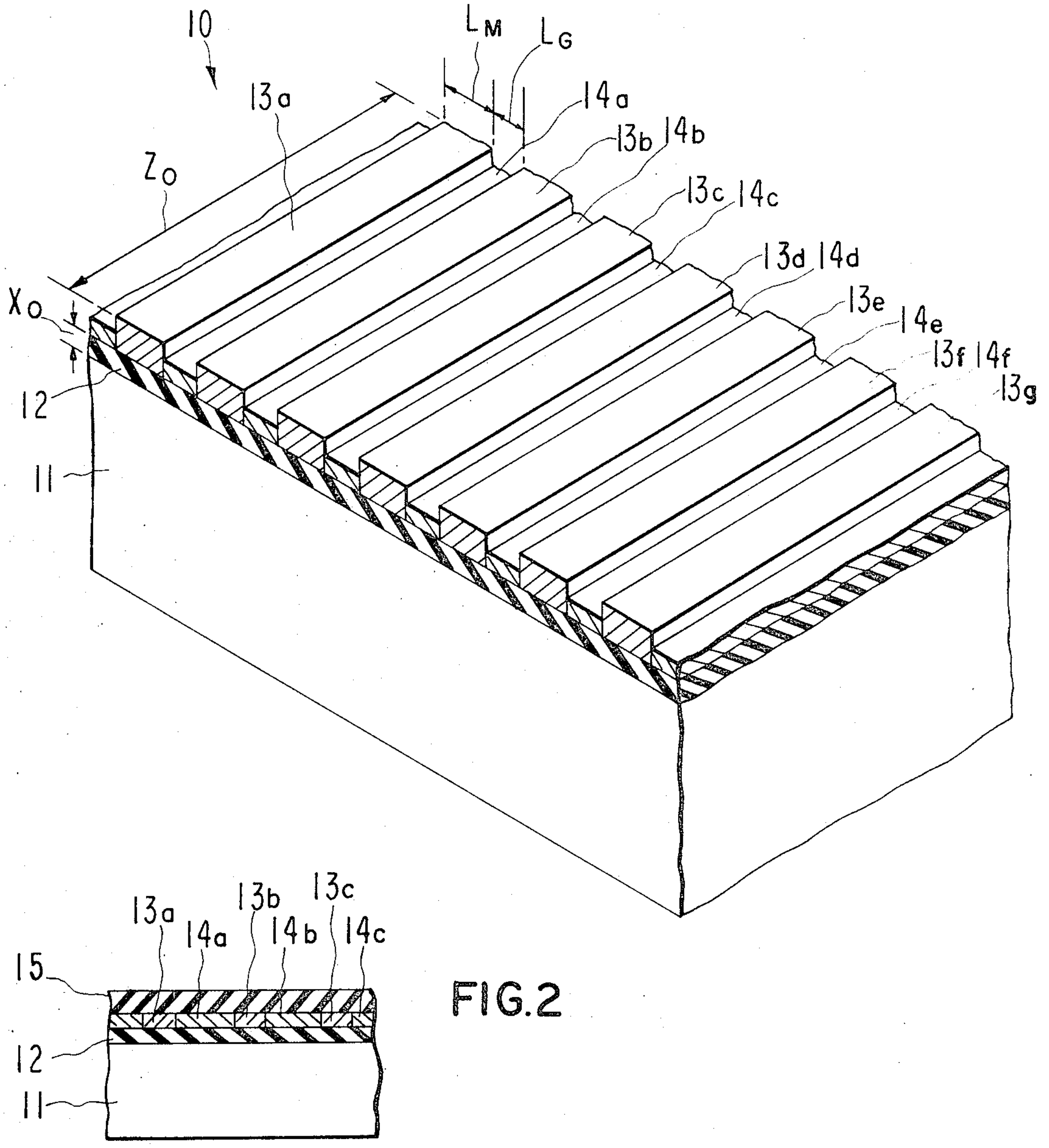
FIG. 1, FIG. 2
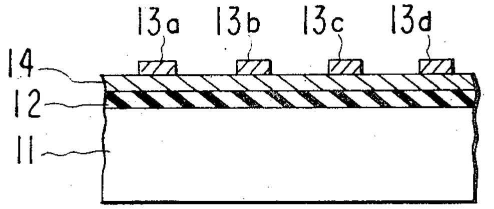
FIG. 3
INVENTORS
CHOONG-KI KIM
EDWARD H. SNOW
BY Alan H. MacPherson
ATTORNEY

CHARGE COUPLED DEVICES WITH CONTINUOUS RESISTOR ELECTRODE

BACKGROUND OF THE INVENTION

1. Field of the Invention

This invention relates to charge coupled semiconductor devices and in particular to a charge coupled device wherein the spaced electrodes overlying an insulating layer on the semiconductor substrate are interconnected by resistive material.

2. Prior Art

W. S. Boyle and G. E. Smith described the basic concept of charge coupled semiconductor devices in an article published in the Apr. 19, 1970 Bell System Technical Journal, page 587, entitled "Charge Coupled Semiconductor Devices." As described by Boyle and Smith, a charge coupled device consists of a metal-insulation-semiconductor (MIS) structure in which minority carriers are stored in a "spatially defined depletion region," also called a "potential well" at the surface of the semiconductor material. The charge is moved along the surface by moving the potential minimum. A paper on page 593 of the same volume of the Bell System Technical Journal by Amelio et al. entitled "Experimental Verification of the Charge Coupled Device Concept" describes experiments carried out to demonstrate the feasability of the charge coupled device concept.

As discussed by Boyle and Smith, charge coupled devices are potentially useful as shift registers, delay lines, and, in two dimensions, as imaging devices or display devices.

One problem with the construction of charge coupled devices is that the electrodes must be closely spaced. A typical spacing required is 0.1 mils or about 2.5 microns. Variations in spacing result in variations in potential between electrodes. These variations influence the efficiency of the charge transfer along the surface of the semiconductor material.

SUMMARY OF THE INVENTION

This invention improves the efficiency of transfer of charge along the surface of the semiconductor device and at the same time reduces the processing difficulties associated with the spacing of a plurality of electrodes along the surface of the insulation layer overlying the semiconductor material. The structure of this invention can be produced with a higher yield than achieved with prior art charge coupled structures.

According to this invention a charge coupled device comprises a semiconductor substrate on which is formed an insulating layer; a plurality of spaced electrodes are formed on the surface of the insulating layer and separated from each other by resistive material. In one embodiment, the electrodes are formed with metal and a resistive material is placed between the electrodes. In another embodiment, the electrodes are formed from heavily doped polycrystalline silicon while the resistive material is substantially intrinsic polycrystalline silicon.

Surprisingly, the structure of this invention increases the allowable spacing between electrodes without any decrease in the efficiency with which charge is transferred from beneath one electrode to an adjacent electrode. The resistive material between electrodes insures that there are no potential barriers between electrodes inhibiting charge transfer.

DESCRIPTION OF THE DRAWING

FIG. 1 shows isometrically the structure of this invention.

FIG. 2 shows a cross-section of a portion of the structure of this invention constructed using polycrystalline silicon; and FIG. 3 shows in cross-section an alternative structure constructed according to the principles of this invention.

DETAILED DESCRIPTION

A charge coupled device 10 (FIG. 1) comprises a semiconductor substrate 11 on one surface of which is formed insulating layer 12. For convenience in describing the invention, but without limitation to the general applicability to the concepts described herein, substrate 11 will be described as silicon and insulating layer 12 will be described as silicon dioxide. However, it should be understood that any semiconductor material capable of sustaining a surface charge together with an appropriate dielectric layer of layers 12 can be used with this invention.

Overlying the oxide layer 12 are a plurality of electrodes 13*a* through 13*g* separated by a multiplicity of regions of resistive material 14*a* through 14*f*.

As discussed in the above cited article by Amelio et al. a variety of oxides exhibit surface charge storage. The best results obtained by Amelio et al. were obtained with "a dry oxide 1,200 angstroms thick grown in oxygen at 1,100° C" (Amelio et al., April, 1970 BSTJ, page 594). Such oxides are well known in the art and thus the method of forming the oxide on substrate 11 will not be discussed in detail.

Electrodes 13*a* through 13*g* are formed on the top surface of oxide 12. Separating these electrodes are portions of thin film resistive material 14*a* through 14*f*. Typical electrode spacings in the prior art are approximately 0.1 mils. Using resistive material between electrodes, applicants obtained charge coupled devices which operated satisfactorily with spacings between electrodes of up to 0.4 mils or 10 microns.

An embodiment of this invention was produced by forming a layer 13 (FIG. 2) of polycrystalline silicon over oxide 12. Layer 13 was then masked to leave exposed selected portions of the polycrystalline silicon corresponding to the electrodes desired to be formed on the surface of the oxide. Then, a selected dopant was diffused into the exposed regions of polycrystalline silicon to form conductive electrodes 13*a* through 13*c*. By controlling the particular dopant diffused into the exposed polycrystalline silicon material, the work function difference between the gate electrodes and the underlying substrate is controlled. Resistance regions of substantially intrinsic polycrystalline silicon, such as regions 14*a* through 14*c*, separate the doped polycrystalline silicon electrodes.

If desired, a final dielectric layer 15 is placed over layer 13. This dielectric layer, which might, for example, comprise silicon nitride, seals the surface of, and protects the underlying polycrystalline material 13.

Structure built in accordance with this invention had a spacing between the electrodes increased by a factor of four over the spacing disclosed in the above cited article by Amelio et al. These structures exhibited extremely fast transfer of charge. The reason for this is not fully understood.

It was noted that in constructing devices without the resistive material between the electrodes, yields were significantly lower than when devices containing resistive material between the electrodes were constructed.

A typical resistance of the material between each electrode is greater than 100 megohms. The resulting extremely high resistance results in devices constructed in accordance with this invention having very low power dissipation. Typical dissipation for an eight-bit three-phase shift register is about 3 microwatts. This calculation assumes 10 volts difference between all electrodes at all times. In practice, however, delayed impulses are applied to the electrodes and the total power consumption by such a device is less than the above figure by a factor of approximately two-thirds.

The device constructed in accordance with this invention had the following dimensions (refer to FIG. 1):

$X_O$=1,000 anstroms $L_M$=0.6 mils $L_G$=0.4 mils $Z_O$=2 mils

The thickness of the electrodes and the resistive material is typically 0.5 microns.

In a charge coupled device, the charge stored beneath one electrode is transferred to an adjacent electrode by shifting the potential well from the first electrode to the adjacent electrode. The transfer of minority carriers can be achieved only when there is no potential barrier along the interface between the semiconductor material and the insulation between two adjacent electrodes. While in the prior art this elimination of potential barriers was accomplished by placing the two electrodes close together, the close spacing of electrodes made the masking step difficult. The resistive material of this invention between the electrodes insures that the potential distribution on the insulation surface between these electrodes is more nearly linear than with prior art structures. Thus there will be no potential barrier along the insulation semiconductor material interface even with relatively large electrode spacings.

The sheet resistance of the thin film resistor material between the electrodes is large in order to insure small leakage current.

FIG. 3 shows an alternative embodiment of this invention. As in the embodiment of FIGS. 1 and 2, dielectric 12 is formed on semiconductor material 11. A layer of resistive material 14 is then formed on, and adheres to dielectric 12. Next, a metal layer (not shown in FIG. 3) is formed on the top of resistive material 14. This layer is masked to protect those portions of metal layer 13 to be retained on resistive material 14 as electrodes. Then the exposed metal is removed, typically by etching. The resulting structure comprises metal electrodes 13*a* through 13*d* overlying resistive material 14 on top of dielectric 12.

What is claimed is:

1. In a charge coupled device of the type capable of at least selectively storing and transferring charge, comprising a semiconductor body, an insulating layer on one surface of said body, a plurality of electrodes on said insulating layer, and means connected to said electrodes for forming spatially defined depletion regions in said body beneath said electrodes and for transferring charge between said depletion regions, the improvement comprising:

a resistive material of high sheet resistance overlying said insulating layer between adjacent electrodes and interconnecting said adjacent electrodes whereby potential barriers in the semiconductor body between adjacent electrodes are reduced.

2. Structure as in claim 1 wherein said resistive material is polycrystalline silicon.

3. Structure as in claim 2 wherein said electrodes are selectively doped regions of polycrystalline material separated by intrinsic polycrystalline material.

4. Structure as in claim 3 wherein said substrate is silicon and said insulating layer is silicon dioxide.

5. Structure as in claim 1 wherein said resistive material substantially completely overlies said insulating layer between adjacent electrodes.

6. In a charge coupled device of the type capable of at least storing and transferring charge, comprising a semiconductor body, an insulating layer on one surface of said body, a plurality of electrodes overlying said insulating layer, and means connected to said electrodes for forming spatially defined depletion regions in said body beneath said electrodes and for transferring charge between said depletion regions, the improvement comprising:

a resistive material of high sheet resistance overlying said insulating layer, extending beneath said electrodes and interconnecting adjacent electrodes whereby potential barriers between adjacent electrodes are reduced.

7. In a charge coupled device of the type capable of at least storing and transferring charge, comprising a semiconductor body, an insulating layer on one surface of said body, a plurality of electrodes on said insulating layer, and means connected to said electrodes for forming spatially-defined depletion regions in said body beneath said electrodes and for transferring charge between said depletion regions, the improvement comprising:

a resistive material of high sheet resistance interconnecting adjacent electrodes whereby potential barriers between adjacent electrodes are reduced.

* * * * *

UNITED STATES PATENT OFFICE
CERTIFICATE OF CORRECTION

Patent No. 3,728,590 Dated April 17, 1973

Inventor(s) Choong-Ki Kim, et al.

It is certified that error appears in the above-identified patent and that said Letters Patent are hereby corrected as shown below:

Column 2, line 22, cancel "of" and substitute -- or --;

Column 3, line 20, cancel "anstroms" and substitute -- angstroms --.

Claim 1, column 4, line 11, between "forming" and "spatially" insert -- a --; change "regions" to -- region --; line 13, delete "between" and substitute -- from one location to another in --; cancel "regions" and substitute -- region --; line 18, cancel "whereby" and substitute -- thereby to reduce --; line 19, cancel "are reduced".

Claim 6, column 4, line 35, between "forming" and "spatially" insert -- a --; cancel "regions" and substitute -- region --; line 37, cancel "between" and substitute -- from one location to another in --; cancel "regions" and substitute -- region --; line 42, cancel "whereby" and substitute -- thereby to reduce --; line 43, cancel "are reduced".

Claim 7, column 4, line 49, between "ing" and "spatially-defined" insert -- a --; cancel "regions" and substitute -- region --; line 51, cancel "between" and substitute -- from one location to another in --; cancel "regions" and substitute -- region --; line 54, cancel "whereby" and substitute -- thereby to reduce --; line 55, cancel "are reduced".

Signed and sealed this 26th day of February 1974.

(SEAL)
Attest:

EDWARD M.FLETCHER,JR.
Attesting Officer

C. MARSHALL DANN
Commissioner of Patents